(12) United States Patent
Faifman

(10) Patent No.: US 6,208,446 B1
(45) Date of Patent: Mar. 27, 2001

(54) OPTICAL DETECTOR SYSTEM AND OPTICAL COMMUNICATION APPARATUS INCLUDING SAME

(75) Inventor: Alexander Faifman, Qiryat Motzkin (IL)

(73) Assignee: iRLAN Ltd., Migdal Haemek (IL)

( * ) Notice: Subject to any disclaimer, the term of this patent is extended or adjusted under 35 U.S.C. 154(b) by 0 days.

(21) Appl. No.: 08/892,802

(22) Filed: Jul. 15, 1997

(30) Foreign Application Priority Data

Jul. 16, 1996 (IL) .......................................... 118873

(51) Int. Cl.[7] ............................. H04B 10/06; H04B 10/00
(52) U.S. Cl. ..................... 359/189; 359/189; 359/194; 359/152
(58) Field of Search ................................ 359/189, 152, 359/194

(56) References Cited

U.S. PATENT DOCUMENTS

| | | | |
|---|---|---|---|
| 3,993,894 | * 11/1976 | Walker ................................ | 235/61.11 |
| 4,399,563 | * 8/1983 | Greenberg ............................. | 455/607 |
| 4,497,068 | * 1/1985 | Fischer .................................. | 455/608 |
| 4,510,536 | * 4/1985 | Tabata et al. .......................... | 360/65 |
| 4,831,662 | * 5/1989 | Kuhn ..................................... | 455/608 |
| 4,968,968 | * 11/1990 | Taylor ................................... | 342/174 |
| 5,048,055 | * 9/1991 | Creigh et al. ........................... | 375/11 |
| 5,051,799 | * 9/1991 | Paul et al. .............................. | 375/25 |
| 5,252,930 | * 10/1993 | Blauvelt ................................ | 330/149 |
| 5,257,285 | * 10/1993 | Thorp ................................... | 375/11 |
| 5,347,529 | * 9/1994 | Noe ....................................... | 372/28 |
| 5,361,156 | * 11/1994 | Pidgeon ................................ | 359/161 |
| 5,473,460 | * 12/1995 | Haner et al. .......................... | 359/188 |
| 5,900,960 | * 5/1999 | Reime ................................... | 359/189 |

FOREIGN PATENT DOCUMENTS 2 150 383 * 6/1985 (GB) .

* cited by examiner

Primary Examiner—Jason Chan
Assistant Examiner—Mohammad Sedighian
(74) Attorney, Agent, or Firm—Helfgott & Karas, P.C.

(57) ABSTRACT

This invention discloses an optical detector system, including a photo detector generating an electrical current according to light received thereby, voltage terminals at opposite sides of the photo detector for connection to a voltage source, a pair of resistors each connected between a voltage terminal and the respective side of the photo detector, a pair of matched amplifiers each having an input connected to the juncture between the respective resistor and the respective side of the photo detector, each of the matched amplifiers having an input resistance substantially less than that of the resistor to which it is connected, and an output circuit combining the outputs of the matched amplifiers.

16 Claims, 3 Drawing Sheets

OPTICAL DETECTOR SYSTEM AND OPTICAL COMMUNICATION APPARATUS INCLUDING SAME

FIELD OF THE INVENTION

The present invention relates to a novel optical detector system, and also to optical communication apparatus including the novel detector system. The invention is particularly useful in receivers, transmitters and transceivers of binary-coded optical data in the infrared region, and is therefore described below with respect to such an application, but it will be appreciated that the invention could advantageously be used in many other applications.

U.S. Pat. No. 5,355,242 discloses an optical receiver which includes a photo detector array generating an electrical current according to the light received thereby. The output of the photo detector is fed to a transimpedance amplifier which includes a feedback resistor, and then through a limiter circuit which includes a bandpass filter and a limiting amplifier. The system described in that patent further includes an untuned transformer which returns to ground the direct current arising from ambient light while the binary encoded data signals are passed via the secondary winding of the untuned transformer to the transimpedance amplifier.

SUMMARY OF THE INVENTION

An object of the present invention is to provide an optical detector system having an increased sensitivity such that it is capable of increasing the signal-to-noise ratio (SNR). Another object of the present invention is to provide an optical detector system having an adaptive sensitivity, which automatically changes in response to the ambient light conditions. Further objects of the invention are to provide a transceiver and also a transmitter particularly useful with the novel optical detector system.

According to one aspect of the present invention, there is provided an optical detector system, comprising: a photo detector generating an electrical current according to light received thereby; voltage terminals at opposite sides of the photo detector for connection to a voltage source; a pair of resistors each connected between a voltage terminal and the respective side of the photo detector; a pair of matched amplifiers each having an input connected between the respective resistor and the respective side of the photo detector, each of the amplifiers having an input resistance substantially less than that of the resistor to which it is connected; and an output circuit combining the outputs of the matched amplifiers.

As will be described more particularly below, such a system utilizes the current produced by the photo detector twice, and thereby increases the sensitivity and SNR.

According to further features in the described preferred embodiment, the matched amplifiers are transimpedance amplifiers; also, the output circuit includes a bandpass filter, preferably having a bandpass of 1–15 MHz, and a gating circuit operated by a threshold level signal.

According to another aspect of the present invention, there is provided an optical detector system, comprising: a photo detector generating an electrical current according to light received thereby; and an output circuit receiving the output of the photo detector; the output circuit including a gating circuit having a threshold level generator for generating an adaptive threshold level signal varying with ambient light intensity for gating the output circuit.

Since the sensitivity of the system is adaptive to variations in the ambient light intensity, false digital pulses, generated in the quantizer portion of a digital receiver usually caused by increased noise level relative to an otherwise fixed threshold level, are thus avoided.

According to a still further aspect of the present invention, there is provided a light transmitter for transmitting code pulses, comprising: a light source; an input port for receiving the code pulses to be transmitted; and a pre-equalization circuit connected to the input port for receiving the code pulses to be transmitted, and for utilizing them to drive the light source while compensating for amplitude and phase distortions caused by different attentuations of the code pulses of different durations in the transmission system (transmitter, medium and receiver). The invention is particularly useful in systems wherein the code pulses are Manchester encoded pulses, and include a train of pulses of 50 nsec and 100 nsec duration. The transmission system attenuates pulses of 50 nsec more than 100 nsec pulses. Therefore pre-equalization ensures that both the 50 nsec and 100 nsec pulses will be roughly the same amplitude at the output of the bandpass filter of the receiver. Maximum sensitivity of the receiver is achieved in this way. The pre-equalization circuit reduces the current through the LEDs when a 100 nsec pulse is being transmitted. After 50 nsec of a 100 nsec pulse, the current level is reduced to approximately $\frac{2}{3}$ of its peak for the remaining 50 nsec.

Further features and advantages of the invention will be apparent from the description below.

BRIEF DESCRIPTION OF THE DRAWINGS

The invention is herein described, by way of example only, with reference to the accompanying drawings, wherein.

DETAILED DESCRIPTION OF THE PREFERRED EMBODIMENTS

Figure 1:
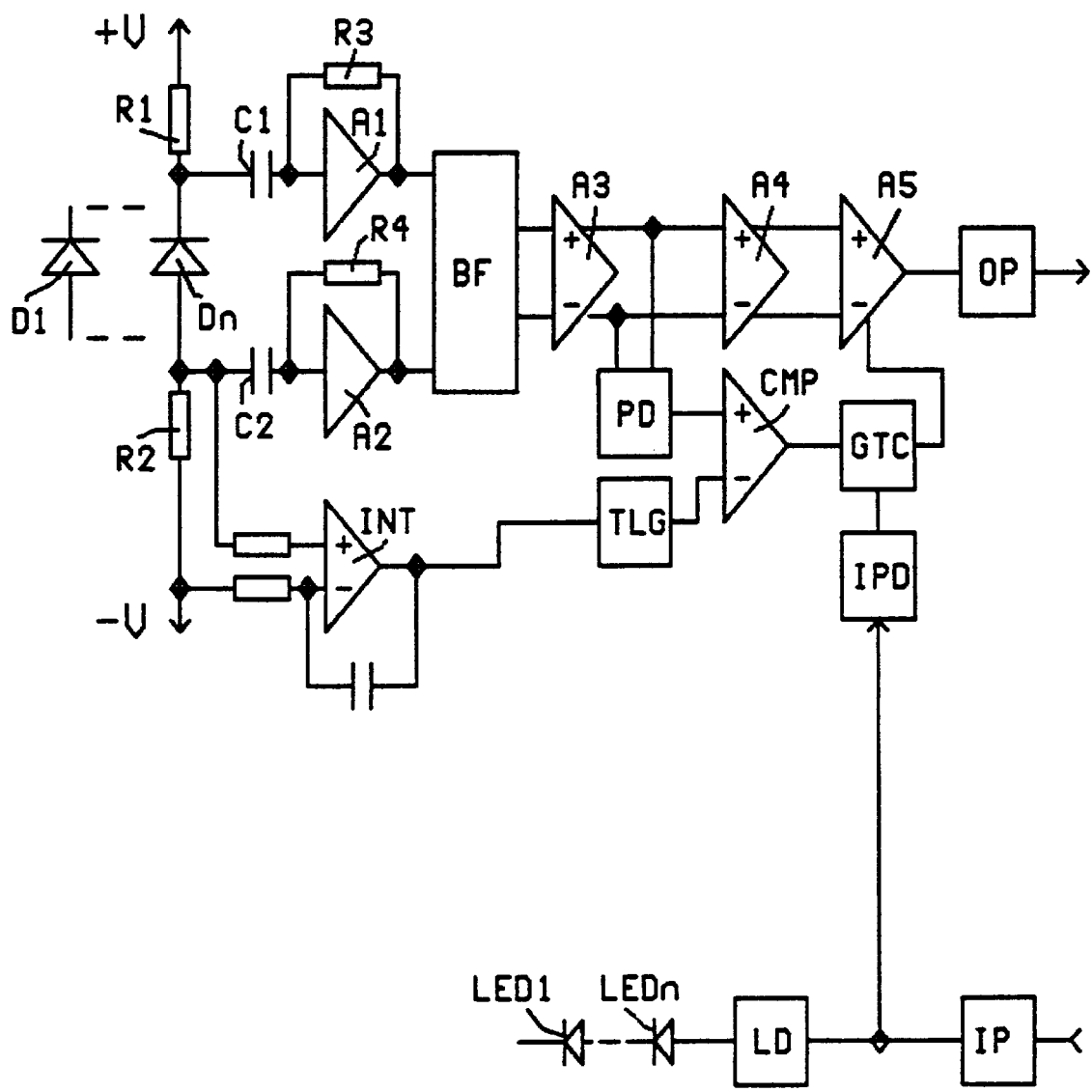
FIG. 1 illustrates one form of transceiver constructed in accordance with the present invention.

FIG. 1 illustrates an optical transceiver operating in the infrared range, including a transmitter in the form of an array of infrared light-emitting diodes (LEDs) LED1–LEDn, and a receiver or detector including an array of infrared photodiodes D1–Dn. The photodiode array D1–Dn includes voltage terminals +V, −V, at opposite sides of the array for connection to a voltage source via input resistors R1, R2.

The illustrated receiver further includes a pair of matched transimpedance amplifiers A1, A2, each having a feedback resistor R3, R4. The input to amplifier A1 is connected via coupling capacitor C1 to the juncture between resistor R1 and the respective side of the photodiode array D1–Dn; whereas the input of the other matched amplifier A2 is connected via its coupling capacitor C2 to the juncture between resistor R2 and the opposite side of the photodiode array. Each of the matched amplifiers A1, A2 has an input resistance which is substantially less than that of the respective resistor R1, R2 to which it is connected.

It will thus be seen that a large proportion of the signal from the photodiode array D1–Dn is applied as inputs to the matched transimpedance amplifiers. The photo detector array D1–Dn generates an electrical current corresponding to the light received thereby. This current is available at both terminals of the photo detector array, and therefore can drive both transimpedance amplifiers A1, A2. Such an arrangement thus doubles the circuit gain, and also improves the common-mode rejection of coupled noise.

The outputs of the transimpedance amplifiers A1, A2 are fed to a bandpass filter BF, which passes a band of 1–15 MHz. The low-frequency end of this band is preferably about 1 MHz in order to minimize the interference produced by fluorescent lamps which use active ballast circuits that produce light interferences at frequencies from 40 KHz to 80 KHz. The high frequency end of this band is preferably at 15 MHz for a 10 Mbps Manchester coded baseband signal, as in the case of an Ethernet communication system.

The output from the bandpass filter BF is fed to limiter amplifiers A3 and A4, and to a gated amplifier A5 to an output port OP.

The illustrated system further includes a differential integrator INT which continuously monitors the ambient light as detected by the photo detector array D1–Dn, and as appearing across a load resistor, in this case resistor R2, receiving the current generated by the photo detector array at one side of that array. Differential integrator INT feeds a resulting voltage to a threshold level generator TLG which produces an output according to the instantaneous ambient light sensed by the photo detector array D1–Dn. This threshold level voltage is applied to one input of a comparator CMP.

Comparator CMP receives another input from a peak detector PD, which detects the peak of the output from limiter amplifier A3 and performs a wideband full-wave rectification of that signal before outputting it to the comparator CMP. This output signal from peak detector PD is compared with the instantaneous threshold value outputted by the threshold level generator TLG according to the instantaneous ambient light condition as detected by the photo detector array D1–Dn. Comparator CMP will thus output a logic LOW signal when the input from the peak detector PD is below the instantaneous threshold level, and a logic HIGH signal when that input is above the instantaneous threshold level.

The output from comparator CMP is fed to a gate control circuit GTC which controls the gates amplifier A5. Thus, gate control circuit GTC enables the gated amplifier A5 only when there is a HIGH output from the comparator CMP.

Gate control circuit GTC also enables the gated amplifier A5 only when the transmitter LED1–LEDn is not transmitting. Thus, the transmitter includes an input port IP which drives the LED driver LD, and also an input packet delimiter IPD. Delimiter IPD determines the start and the end of a packet received from the input port IP for transmission by the transmitter LED1–LEDn. When the input packet delimiter IPD receives such a signal from the input port IP, it outputs a signal to the gate control circuit GTC which disables the gated amplifier A5 from producing an output to the output port OP.

The foregoing arrangement of matched transimpedance amplifiers A1, A2 thus increases the sensitivity of the detector since it uses twice the current generated by the photo detector array D1–Dn. As a result, the output signal of the photo detector array D1–Dn is substantially doubled as compared to the output signal produced by a conventional single-ended amplifier with the same photo detector area. At the same time, the electronic noise signals produced by the two matched amplifiers A1, A2 are not correlated such that the combination of the noise magnitudes is only 1.41 times larger than that of a single-ended transimpedance amplifier. Moreover, common mode noise is rejected due to the operation of both transimpedance amplifiers A1 and A2 in the differential mode. As a result, with a given photo detector area the described arrangement produces at least a 3 dB improvement in SNR over conventional single-ended amplifier designs. Further, the described arrangement provides an adaptive sensitivity which varies with the instantaneous ambient light conditions.

The described arrangement is thus very advantageous in applications where arrays of photodiodes or other photo detectors are used since it provides a maximum SNR with a minimum photo detector total area. This enables lowering the capacitance value at the input of the transimpedance amplifier and the noise level at the transimpedance amplifier output. When a predetermined minimum performance is needed, the described arrangement enables the area of the photo detector to be reduced by a factor of 2 as compared to the area required with previously-known arrangements.

Figure 2:
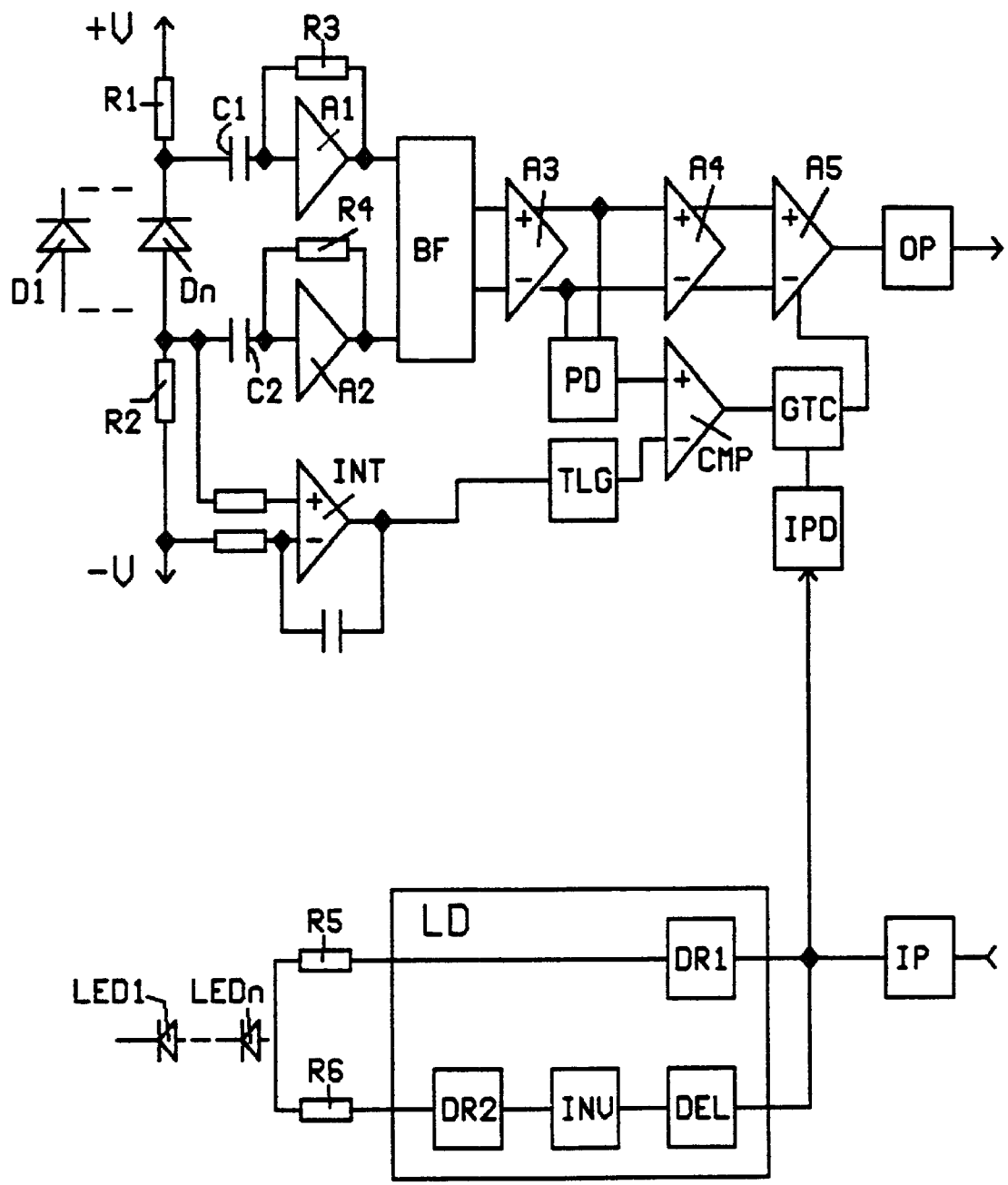
FIG. 2 illustrates a transceiver similar to that of FIG. 1 but including an improved light transmitter.
Figure 3:
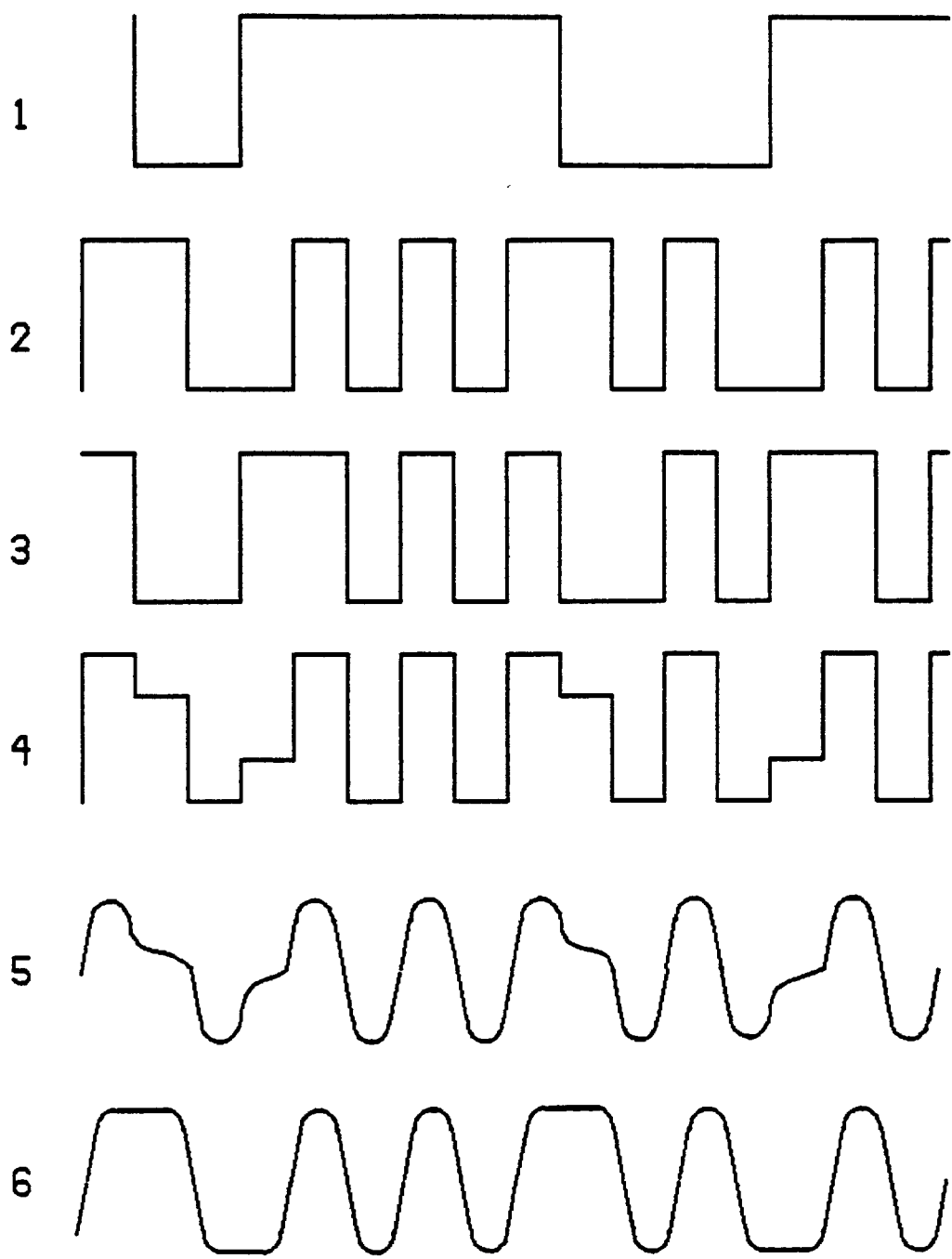
FIG. 3 illustrates a number of waveforms that will be referred to in explaining the operation of the transceiver of FIG. 2.

FIG. 2 illustrates a transceiver according to the system of FIG. 1 but in which the LED driver LD is provided with an equalization circuit which compensates for amplitude and phase distortion caused by different attenuations of code pulses of different durations in the transmission channel (comprised of the transmitter, medium and receiver), such as when transmitting Manchester encoded pulses. Thus, the raw data stream in Manchester encoded pulses are pulses of 50 nsec and 100 nsec duration. The transmission of such code pulses of different durations produces amplitude and phase distortions which are compensated for by the equalization circuit included in the transceiver illustrated in FIG. 2. FIG. 3 illustrates a series of waveforms which will be helpful in explaining the operation of the transceiver of FIG. 2.

To simplify the description while avoiding repetition, those elements which are common to the system of FIG. 1 carry the same reference symbols in FIG. 2 as in FIG. 1. The main difference in the transceiver of FIG. 2 over that of FIG. 1 is in the LED driver circuit LD.

As shown in FIG. 2, the LED driver circuit, therein also designated LD, includes a first driver DR1 which receives the code pulses from the input port IP, and a second driver DR2 which also receives the code pulses from the input port IP. However, the code pulses from the input port IP are first fed to a delay circuit DEL and then to an inverter circuit INV before being received by the second driver DR2. The delay circuit DL delays the pulses for 50 nsecs, and inverter INV inverts these pulses before feeding them to the second driver DR2.

The first driver circuit DR1 applies its output to resistor R5; and the second driver circuit DR2, after the delay by DEL and the inversion by INV, applies its output to a second resistor R6. The two resistors R5, R6 combine the outputs of the two driver circuits DR1, DR2 before they are fed to the array of lighting devices LEDs LED1–LEDn. The two resistors R5, R6 have relative resistance values to produce a predetermined peak reduction in the current through the LEDs for the second part of the 100 nsec pulses.

Preferably, the code pulses to be transmitted are Manchester encoded, in which case the pulses applied to the input port IP are of 50 nsec and 100 nsec duration. In such case, the pre-equalization circuit including the resistors R5, R6 reduces the current through the LEDs when a 100 nsec pulse is being transmitted; thus, after 50 nsec of a 100 nsec pulse, the current level is reduced to approximately ⅔ of its peak for the remaining 50 nsec.

The operation of the equalization circuit illustrated in FIG. 2 will be better understood by reference to the waveforms of FIG. 3.

In FIG. 3, waveform 1 illustrates the NRZ coding, and waveform 2 illustrates the Manchester encoded pulses applied to the input port IP. These pulses also appear in the output of the first driver circuit DR1 applied to resistor R5.

The second driver DR2 circuit receives the same coded pulses from the input port IP, except that the delay circuit DEL applies a 50 nsec delay to such pulses, and the inverter INV inverts the pulses, before being received by the second driver circuit DR2. The output from the second driver circuit DR2 is illustrated by waveform 3 in FIG. 3 and is applied to resistor R6.

As described earlier, resistors R5 and R6 combine the outputs of the two driver circuits DR1, DR2 before feeding them to the array of LEDs, but these resistors have resistance values relative to each other such as to produce a one-third peak reduction in the current through the LEDs for the second part of the 100 nsec pulse. Waveform 4 in FIG. 3 illustrates the current applied to the LEDs by the two driver circuits DR1, DR2 and their respective resistors R5, R6.

Waveform 5 in FIG. 3 illustrates the input into the receiver as detected by photodiodes D1–Dn. This input into the receiver is fed through the bandpass filter BF. Waveform 6 in FIG. 3 illustrates the output of the bandpass filter BF. The output of this filter is processed as described above with respect to FIG. 1.

The above-described optical detector system, light transmitter, and transceiver, are particularly useful in digital wireless communication systems operating in the infrared domain, e.g., IrDA's SIR and FIR, and in wireless LAN systems which are compatible with various standards, e.g., Ethernet, IEEE 802.11 and Token Ring. The described systems are especially useful for high speed systems (10 Mbps or more) which include omnidirectional through-the-air infrared receivers operating by the reflection of IR light off the walls, ceilings, objects, etc. In these applications, the incident energy level of the receiver's area is often very small, in the order of a few nanowatts. Therefore, it is necessary to provide a maximum SNR, by using light gathering lenses, and reverse biased large area receptors (photodiodes). On the other hand, a large area receptor is both detrimental in terms of speed (because of its large capacitance), susceptibility to noise generated by ambient light, and also cost which is proportional to the photodiode's area. The cost of the lens is also affected since its cost is related to its size, which is related to the size of the photodiode.

The adaptive threshold concept described above is particularly useful in IR wireless networking that employ the CSMA/CD or the CSMA/CA protocol. These protocols rely on "clean channels" for communication traffic. Noise in the form of sporadic pulses received by the networked parties are as detrimental (in terms of impact on the throughput) as any other problem source such as incomplete packets, CRC errors, etc. Thus, it is important to have a high threshold level at the comparator input in case of high ambient light induced noise. On the other hand, a high threshold level restricts the range such IR wireless transceivers are capable of operating. The above described adaptive threshold concept thus provides the appropriate threshold level according to the changing circumstances.

While the invention has been described with respect to two preferred embodiments, it will be appreciated that these are set forth merely for purposes of example, and that many variations may be made. For example, whereas the light emitting elements are described as light emitting diodes (LEDs), other light emitting elements can be used, such as lasers. Many other variations, modifications and applications of the invention may be made.

What is claimed is:

1. An optical detector system, comprising:
   a photo detector generating an electrical current according to light received thereby;
   voltage terminals at opposite sides of the photo detector for connection to a voltage source;
   a pair or resistors each connected between a voltage terminal and the respective side of the photo detector;
   a pair of matched amplifiers each having an input connected to the juncture between the respective resistor and the respective side of the photo detector, each of said matched amplifiers having an input resistance substantially less than that of the resistor to which it is connected;
   and an output circuit combining the outputs of said matched amplifiers, wherein said optical circuit comprises a gating circuit operated by a threshold level signal, and said gating circuit comprises:
      an integrator for integrating a signal corresponding to the output of the photo detector;
      a peak detector for detecting the peak of the combined outputs of said matched simplifiers; and
      a comparator having one input from said peak detector, a second input from said integrator, and an output controlled by said inputs for gating the outputs of said matched amplifiers, wherein said gating circuit further includes a gated amplifier receiving the combined outputs of said matched amplifiers and gated by the output of said comparator.

2. The system according to claim 1, wherein said photo detector is an array of infrared sensitive photo detectors.

3. The system according to claim 1, wherein said output circuit further includes a limiter amplifier connected between said matched amplifiers and said peak detector.

4. A transceiver comprising:
   an optical detector system comprising:
      a photo detector generating an electrical current according to light received thereby:
      voltage terminals at opposite sides of the photo detector for connection to a voltage source;
      a pair of resistors each connected between a voltage terminal and the respective side of the photo detector;
      a pair of matched amplifiers each having an input connected to the juncture between the respective resistor and the respective side of the photo detector, each of said matched amplifiers having an input resistance substantially less than that of the resistor to which it is connected;
      and an output circuit combining the outputs of said matched amplifiers;
   a transmitter system including a light transmitter; and
   a disabling circuit disabling the optical detector system during energization of the light transmitter;
   wherein said transmitter system transmits code pulses of first and second durations, and includes a pre-equalization circuit for receiving said code pulses and for utilizing them to drive the light transmitter while compensating for amplitude and phase distortions caused by different attenuations of the code pulses of different durations.

5. The transceiver according to claim 4, wherein said pre-equalization circuit comprises:
   a first driver circuit for receiving the code pulses to be transmitted and producing an output applied to a first resistor;

and a second driver circuit for also receiving the code pulses to be transmitted, said second driver circuit producing, for each of said code pulses, a delay of one-half the duration of the BIT period, inverting the pulse, and producing an output to a second resistor;

said first and second resistors combining the outputs of said first and second driver circuits before feeding same to the light transmitter, and having relative resistance values to produce a predetermined peak reduction in the current through the light transmitter.

6. The transceiver according to claim 5, wherein said code pulses are Manchester encoded pulses and include a train of pulses of 50 nsec and 100 nsec duration, said equalization circuit effecting a one-third reduction in the peaks of the current through the light transmitter in the second 50 nsec of the 100 nsec pulses as compared to the first 50 nsec of the 100 nsec pulses.

7. The transceiver according to claim 4, wherein said code pulses are Manchester encoded pulses and include a train of pulses of 50 nsec and 100 nsec duration, said equalization circuit effecting a one-third reduction in the peaks of the current through the light transmitter in the second 50 nsec of the 100 nsec pulses as compared to the first 50 nsec of the 100 nsec pulses.

8. A transceiver comprising:
an optical detector system, comprising:
a photo detector generating an electrical current according to light received thereby;
and an output circuit receiving the output of said photo detector;
said output circuit including a gating circuit having a threshold level generator for generating an adaptive threshold level signal varying with ambient light intensity for gating said output circuit;
a transmitter system including a light transmitter; and
a disabling circuit disabling the optical detector system during energization of the light transmitter;
wherein said transmitter system transmits code pulses of first and second durations, and includes a pre-equalization circuit for receiving said code pulses and for utilizing them to drive the light transmitter while compensating for amplitude and phase distortions caused by different attenuations of the code pulses of different durations.

9. The system according to claim 8, wherein said photo detector is an array of infrared sensitive photo detectors.

10. The system according to claim 8, wherein said gating circuit includes:
an integrator for integrating a signal corresponding to the output of the photo detector;
a peak detector for detecting the peak of the output of said photo detector;
and a comparator having one input from said peak detector, a second input from said integrator, and an output controlled by said inputs for gating said output circuit.

11. The system according to claim 8;
wherein said photo detector includes voltage terminals at opposite sides for connection to a voltage source, and a pair of resistors each connected between a voltage terminal and the respective side of the photo detector;
and wherein said output circuit includes a pair of matched amplifiers each having an input connected between the respective resistor and the respective side of the photo detector, each of said matched amplifiers having an input resistance substantially less than the resistor to which it is connected, the outputs of said matched amplifiers being gated by said gating circuit.

12. The transceiver according to claim 8, wherein said pre-equalization circuit comprises:
a first driver circuit for receiving the code pulses to be transmitted and producing an output applied to a first resistor;
and a second driver circuit for also receiving the code pulses to be transmitted, said second driver circuit producing, for each of said code pulses, a delay of one-half the duration of the BIT period, inverting the pulse, and producing an output to a second resistor;
said first and second resistors combining the outputs of said first and second driver circuits before feeding same to the light transmitter, and having relative resistance values to produce a predetermined peak reduction in the current through the light transmitter.

13. The transceiver according to claim 12, wherein said code pulses are Manchester encoded pulses and include a train of pulses of 50 nsec and 100 nsec duration, said equalization circuit effecting a one-third reduction in the peaks of the current through the light transmitter in the second 50 nsec of the 100 nsec pulses as compared to the first 50 nsec of the 100 nsec pulses.

14. The transceiver according to claim 8, wherein said code pulses are Manchester encoded pulses and include a train of pulses of 50 nsec and 100 nsec duration, said equalization circuit effecting a one-third reduction in the peaks of the current through the light transmitter in the second 50 nsec of the 100 nsec pulses as compared to the first 50 nsec of the 100 nsec pulses.

15. A light transmitter for transmitting multi-bit code pulses of first and second durations, comprising:
a light source;
an input port for receiving the code pulses to be transmitted;
and a pre-equalization circuit connected to said input port for receiving the code pulses to be transmitted, and for utilizing them to drive the light source while compensating for amplitude and phase distortions caused by different attenuations of the code pulses of different durations, wherein said pre-equalization circuit comprises:
a first driver circuit for receiving the code pulses to be transmitted and producing an output applied to a first resistor;
and a second driver circuit for also receiving the code pulses to be transmitted, said second driver circuit producing, for each of said code pulses, a delay of one-half the bit period, inverting the pulse, and producing an output to a second resistor;
said first and second resistors combining the outputs of said first and second driver circuits before feeding same to the light source, and having relative resistance values to produce a predetermined peak reduction in the current through the light source in the second half of the longer duration pulse.

16. The light transmitter according to claim 15, wherein said code pulses are Manchester encoded pulses and include a train of pulses of 50 nsec and 100 nsec duration, said equalization circuit effecting a one-third reduction in the peaks of the current through the light source during the second half period of the 100 nsec pulses as compared to the first 50 nsec of the 100 nsec pulses.

* * * * *